US012801620B2

(12) United States Patent
Gong et al.

(10) Patent No.: US 12,801,620 B2
(45) Date of Patent: Nov. 17, 2026

(54) MANAGEMENT AND ORCHESTRATION OF BACKEND COMPONENTS

(71) Applicant: Dell Products L.P., Round Rock, TX (US)

(72) Inventors: Min Gong, Shanghai (CN); Deepaganesh Paulraj, Bangalore (IN); Ashok Narayanan Potti, Bangalore (IN); Dale Wang, Hayward, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/678,326

(22) Filed: May 30, 2024

(65) Prior Publication Data

US 2025/0371023 A1 Dec. 4, 2025

(51) Int. Cl.
*G06F 16/25* (2019.01)
*G06F 16/215* (2019.01)

(52) U.S. Cl.
CPC .......... *G06F 16/252* (2019.01); *G06F 16/215* (2019.01)

(58) Field of Classification Search
CPC .............................. G06F 16/252; G06F 16/215
See application file for complete search history.

(56) References Cited

U.S. PATENT DOCUMENTS

| | | | |
|---|---|---|---|
| 8,538,897 | B2 | 9/2013 | Han et al. |
| 10,572,329 | B2 | 2/2020 | Harutyunyan et al. |
| 10,616,314 | B1 | 4/2020 | Plenderleith et al. |
| 10,740,793 | B1 | 8/2020 | Sussman et al. |
| 10,776,196 | B2 | 9/2020 | Ohana et al. |
| 10,853,867 | B1 | 12/2020 | Bulusu et al. |
| 11,461,163 | B1 | 10/2022 | Aggarwal |
| 11,513,930 | B2 | 11/2022 | Chan et al. |
| 11,514,347 | B2 | 11/2022 | Dinh |
| 11,720,940 | B2 | 8/2023 | Lakshminarayan et al. |
| 11,734,102 | B1 | 8/2023 | Wang et al. |
| 11,748,185 | B2 | 9/2023 | Xu et al. |
| 11,803,440 | B2 | 10/2023 | Harutyunyan |

(Continued)

FOREIGN PATENT DOCUMENTS

| | | | |
|---|---|---|---|
| CN | 108280168 | A | 7/2018 |
| CN | 111476371 | A | 7/2020 |

(Continued)

OTHER PUBLICATIONS

Zhao, Wayne Xin, et al., "A Survey of Large Language Models," arXiv preprint arXiv:2303.18223 (2023) (97 Pages).

(Continued)

*Primary Examiner* — Charles Rones
*Assistant Examiner* — Xiaoqin Hu
(74) *Attorney, Agent, or Firm* — WOMBLE BOND DICKINSON (US) LLP

(57) ABSTRACT

Methods and systems for managing backend components are disclosed. In particular, the backend component management and orchestration process provides a holistic and adaptive approach that allows for automatic backend component selection to fit one or more user's needs. Additionally, the system intelligently evaluates user feedback associated with the backend components to continually refine and adapt each backend component's performance parameters based on real-time user interactions with these backend components.

20 Claims, 6 Drawing Sheets

(56) References Cited

U.S. PATENT DOCUMENTS

| | | | |
|---|---|---|---|
| 11,809,271 | B1 | 11/2023 | Wang |
| 11,909,836 | B2 | 2/2024 | Wulf et al. |
| 12,061,970 | B1 | 8/2024 | Lo et al. |
| 12,111,747 | B1 * | 10/2024 | Jain ........................... G06F 8/41 |
| 2009/0113248 | A1 | 4/2009 | Bock et al. |
| 2009/0216910 | A1 | 8/2009 | Duchesneau |
| 2010/0257058 | A1 | 10/2010 | Karidi et al. |
| 2010/0318856 | A1 | 12/2010 | Yoshida |
| 2013/0041748 | A1 | 2/2013 | Hsiao et al. |
| 2013/0198240 | A1 | 8/2013 | Ameri-Yahia et al. |
| 2014/0310222 | A1 | 10/2014 | Davlos et al. |
| 2015/0227838 | A1 | 8/2015 | Wang et al. |
| 2015/0288557 | A1 | 10/2015 | Gates et al. |
| 2016/0124823 | A1 | 5/2016 | Ruan |
| 2018/0205645 | A1 | 7/2018 | Bays |
| 2019/0095313 | A1 | 3/2019 | Xu et al. |
| 2019/0129785 | A1 | 5/2019 | Liu et al. |
| 2020/0026590 | A1 | 1/2020 | Lopez et al. |
| 2020/0401397 | A1 | 12/2020 | Thomas |
| 2021/0027205 | A1 | 1/2021 | Sevakula et al. |
| 2021/0144107 | A1 * | 5/2021 | Liang ........................ G06N 5/04 |
| 2021/0227351 | A1 * | 7/2021 | Mei ......................... H04L 67/14 |
| 2021/0241141 | A1 | 8/2021 | Dugger et al. |
| 2021/0241152 | A1 * | 8/2021 | Fong ...................... G06N 20/00 |
| 2021/0287109 | A1 | 9/2021 | Cmielowski et al. |
| 2022/0100187 | A1 | 3/2022 | Isik et al. |
| 2022/0283890 | A1 | 9/2022 | Chopra et al. |
| 2022/0358005 | A1 | 11/2022 | Saha et al. |
| 2022/0417078 | A1 | 12/2022 | Matsuo et al. |
| 2023/0016199 | A1 | 1/2023 | Jividen et al. |
| 2023/0094373 | A1 | 3/2023 | Muralidharan |
| 2024/0028955 | A1 | 1/2024 | Harutyunyan et al. |
| 2024/0168835 | A1 | 5/2024 | Wang et al. |
| 2025/0086211 | A1 | 3/2025 | Bolcer et al. |

FOREIGN PATENT DOCUMENTS

| | | | |
|---|---|---|---|
| CN | 112541806 | A | 3/2021 |
| EP | 4235505 | A1 | 8/2023 |

OTHER PUBLICATIONS

Kaddour, Jean, et al., "Challenges and Applications of Large Language Models," arXiv preprint arXiv:2307.10169 (2023) (72 Pages).

Naveed, Humza, et al., "A Comprehensive Overview of Large Language Models," arXiv preprint arXiv:2307.06435 (2023) (35 Pages).

Boffa, Matteo, et al., "LogPrécis: Unleashing Language Models for Automated Shell Log Analysi," arXiv preprint arXiv:2307.08309 (2023) (17 Pages).

Chen, Yinfang, et al., "Empowering Practical Root Cause Analysis by Large Language Models for Cloud Incidents," arXiv preprint arXiv:2305. 15778 (2023) (15 Pages).

Lee, Yukyung, et al., "LAnoBERT : System Log Anomaly Detection based on BERT Masked Language Model," Applied Soft Computing 146 (2023): 110689 (18 Pages).

Wang et al., "Self-Consistency Improves Chain of Thought Reasoning in Language Models", arXiv preprint arXiv:2203.11171v4, Mar. 7, 2023 (24 pages).

* cited by examiner

MANAGEMENT AND ORCHESTRATION OF BACKEND COMPONENTS

FIELD

Embodiments disclosed herein relate generally to back-end component orchestration and management. More particularly, embodiments disclosed herein relate to systems and methods to orchestrate use of backend components to fulfill user requests.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
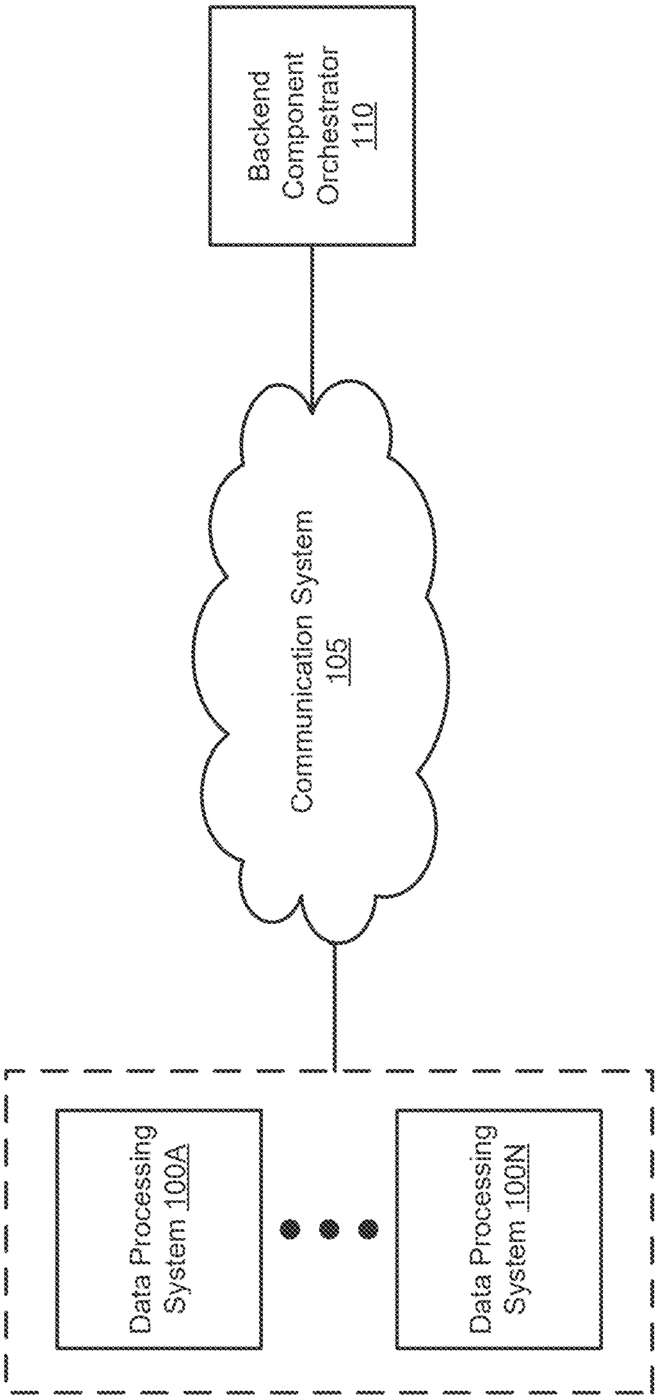
FIG. 1 shows a block diagram illustrating a system in accordance with one or more embodiments.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing and orchestrating backend components (also referred to herein as "back end components" or "back-end components"). In particular, user-facing (e.g., frontend, front-end, or front end) applications are always associated with one or more backend components (e.g., models, policies, backend applications, data and infrastructures, or the like) that are not visible and/or made available to users. User inputs from these user-facing applications trigger calls (e.g., application programming interface (API) calls, or the like) to these backend components, which then execute process(es) and return results for the user inputs.

Entities (e.g., businesses, enterprises, corporations, or the like) having large numbers of backend components face challenges in integrating outputs from these backend components (e.g., outputs from various models such as statistical models, artificial intelligence (AI) models, rule-based policies, or the like). As the number of an entity's backend components increases, decision making becomes more complex and uncertain.

For example, a team or individual within the entity may want to create a triage application. The entity may have several backend components managed by one or more internal teams such as: (i) a rule-based policy that can search keywords to recognize an issue managed by triage engineers; (ii) an AI-based model such as a natural language processor (NLP) model that analyzes service request (SR) ticket information managed by SR analytics data scientists; (iii) another AI-based model that analyzes sequences of logs (e.g., in computer log files, log data, or the like) managed by log files analytics data scientists; and much more.

With so many available options, it would be difficult for the team or individual to choose the best backend component(s) that would fit their needs (e.g., computing resource limitation needs, customer-facing needs, or the like). The individual or team may need to either try out all of these options and/or reach out to each of these different teams to get more information on each option, which is not only a waste of limited computing resources (e.g., computing resources required for the individual or team to run and test each option on the entity's computing devices) but also a waste of limited human resources.

Additionally, the selection, invocation, and merging of such backend components for a specific use are all statically determined. This makes the entire application creation process (e.g., the process for creating the triage application in the above-referenced example) less flexible. In particular, the backend components need to be adapted for the requirements of the new application, which further increases the use of limited computing resources for the maintenance and future updates of the new application. Thus, there has been a long-felt need in the industry for processes that are able to not only reduce the use of limited computing resources but also reduce the use of limited human resources for better management and orchestration of an entity's available backend components to fit the entity's needs.

To overcome the above-discussed challenges, the backend component management and orchestration process of one or more embodiments disclosed herein may provide a holistic and adaptive approach that allows for automatic backend component selection to fit a user's (e.g., an individual's, a team's, multiple teams', or the like) needs. Such holistic and adaptive approach may be guided using feedback received from the users. Such feedback (e.g., user feedback) may include information regarding: (i) accuracy and applicability of the selected backend components; (ii) the user's preferences; (iii) invocation metrics (e.g., cost, latency, or the like) associated with each invoked backend components; or the like).

Such information (e.g., real-time user preferences, accuracy evaluations, cost-effectiveness metrics, or the like) may advantageously be used to provide an adaptive backend component selection strategy. For example, the backend component management and orchestration process may advantageously be able to select the most appropriate backend component(s) for a given query (e.g., a user request), even if the selected backend component(s) may not be the backend component(s) with the highest standalone accuracy metric.

Thus, an improved system may be obtained where testing of all available and relevant backend components can be avoided. Limited computing resources of the system (e.g., an entity's internal servers and/or computing devices) may also advantageously saved, which directly improves the functionality (e.g., computer functionalities) of the system itself. Additionally, a user of the system can also advantageously have little to no knowledge about the specific workings of all the available and relevant backend components that may or may not fit the user's needs, which also directly saves use of the limited human resources of the entity and resolves the long-felt need for a process that is able to achieve such resource savings.

In an embodiment, a computer-implemented method for managing backend components is provided. The method may include: obtaining a first user input comprising a first request from a user; invoking, based on data stored in a backend component evaluation data repository, a first set of the backend components to fulfill the first request; and reporting a first result of the fulfillment of the first request to the user.

The first result may include, as information making up the first result: each of the backend components making up the first set of the backend components. And for each of the backend components making up the first set of the backend components: a resolution to the first request, and invocation statistics associated with an obtaining of the resolution.

The data stored in the backend component evaluation data repository comprises an accuracy of each of the backend components and invocation performance of each of the backend components.

The data stored in the backend component evaluation data repository further comprises a user preference of the user.

The accuracy of each of the backend components is based on feedback received from the user and other users that submitted other ones of the first user input.

The method may further include: obtaining, after reporting the first result and from the user, user feedback with regard to the first result; and updating the data stored in the backend component evaluation data repository using the user feedback to obtain an updated backend component evaluation data repository.

The method may further include: obtaining a second user input comprising a second request from the user, the second request being identical to the first request; invoking, based on data stored in updated backend component evaluation data repository, a second set of the backend components to fulfill the second request; and reporting a second result of the fulfillment of the second request to the user.

The second set of the backend components is different from the first set of the backend components.

Reporting the first result of the fulfillment of the first request to the user may include: generating one or more prompts for conveying the information making up the first result; generating, using a large language model (LLM), a summary comprising a summarization of the one or more prompts and the information making up the first result; and providing the summary to the user as the first result.

The one or more prompts are dynamically generated based on a prompt preference of the user.

A non-transitory media may include instructions that when executed by a processor cause the computer-implemented method to be performed.

A data processing system (e.g., a backend component orchestrator) may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services and may be managed by a backend component orchestrator (e.g., backend component orchestrator 110) in order to provide the computer-implemented services. The system may include data processing systems 100A-100N. Data processing systems 100A-100N may include any number of computing devices that provide the computer-implemented services. For example, data processing systems 100A-100N may include one or more computing devices that may independently and/or cooperatively provide the computer-implemented services. For example, all, or a portion, of data processing systems 100A-100N may provide computer-implemented services to users and/or other computing devices operably connected to data processing systems 100A-100N.

The computer-implemented services may include any type and quantity of services including, for example, database services, instant messaging services, video conferencing services, prediction and/or inference generation services, machine learning (ML)/artificial intelligence (AI) related services, data science related services, etc. Different systems may provide similar and/or different computer-implemented services. To provide the computer-implemented services, data processing systems 100A-100N may host applications that provide these (and/or other) computer-implemented services. The applications may be hosted by one or more of data processing systems 100A-100N. These applications may utilize (e.g., invoke use of, or the like) one or more backend components (e.g., models, policies, backend applications, data and infrastructures, or the like) to provide the computer-implemented services.

To manage and orchestrate these backend components, the system of FIG. 1 may include a backend component orchestrator 110. The backend component orchestrator 110 may be configured to perform a portion or all of the processes of one or more embodiments disclosed below in reference to FIGS. 2A-3B.

For example, the backend component orchestrator 110 may be configured to implement the backend component management and orchestration process of one or more embodiments disclosed herein to provide a holistic and adaptive approach that allows for automatic backend component selection to fit a user's (e.g., an individual's, a team's, multiple teams', or the like) needs.

Such holistic and adaptive approach may be guided using feedback received from the users. Such feedback (e.g., user feedback) may include information regarding: (i) accuracy and applicability of the selected backend components; (ii) the user's preferences; (iii) invocation metrics (e.g., cost, latency, or the like) associated with each invoked backend components; or the like). Such information (e.g., real-time user preferences, accuracy evaluations, cost-effectiveness metrics, or the like) may advantageously be used to provide an adaptive backend component selection strategy. For example, the backend component management and orchestration process may advantageously be able to select the most appropriate backend component(s) for a given query (e.g., a user request), even if the selected backend component(s) may not be the backend component(s) with the highest standalone accuracy metric.

Thus, an improved system may be obtained where testing of all available and relevant backend components can be avoided. Limited computing resources of the system (e.g., an entity's internal servers and/or computing devices) may also advantageously saved, which directly improves the functionality (e.g., computer functionalities) of the system itself. Additionally, a user of the system can also advantageously have little to no knowledge about the specific workings of all the available and relevant backend components that may or may not fit the user's needs, which also directly saves use of the limited human resources of the entity and resolves the long-felt need for a process that is able to achieve such resource savings.

Furthermore, when providing their functionality, data processing systems 100A-100N and/or backend component orchestrator 110 may perform all, or a portion, of the method and/or actions shown in FIGS. 2A-3B.

Data processing systems 100A-100N and backend component orchestrator 110 may be implemented using a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. For additional details regarding computing devices, refer to FIG. 4.

Any of the components illustrated in FIG. 1 may be operably connected to each other (and/or components not illustrated) with a communication system 105. In an embodiment, communication system 105 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

Figure 2A:
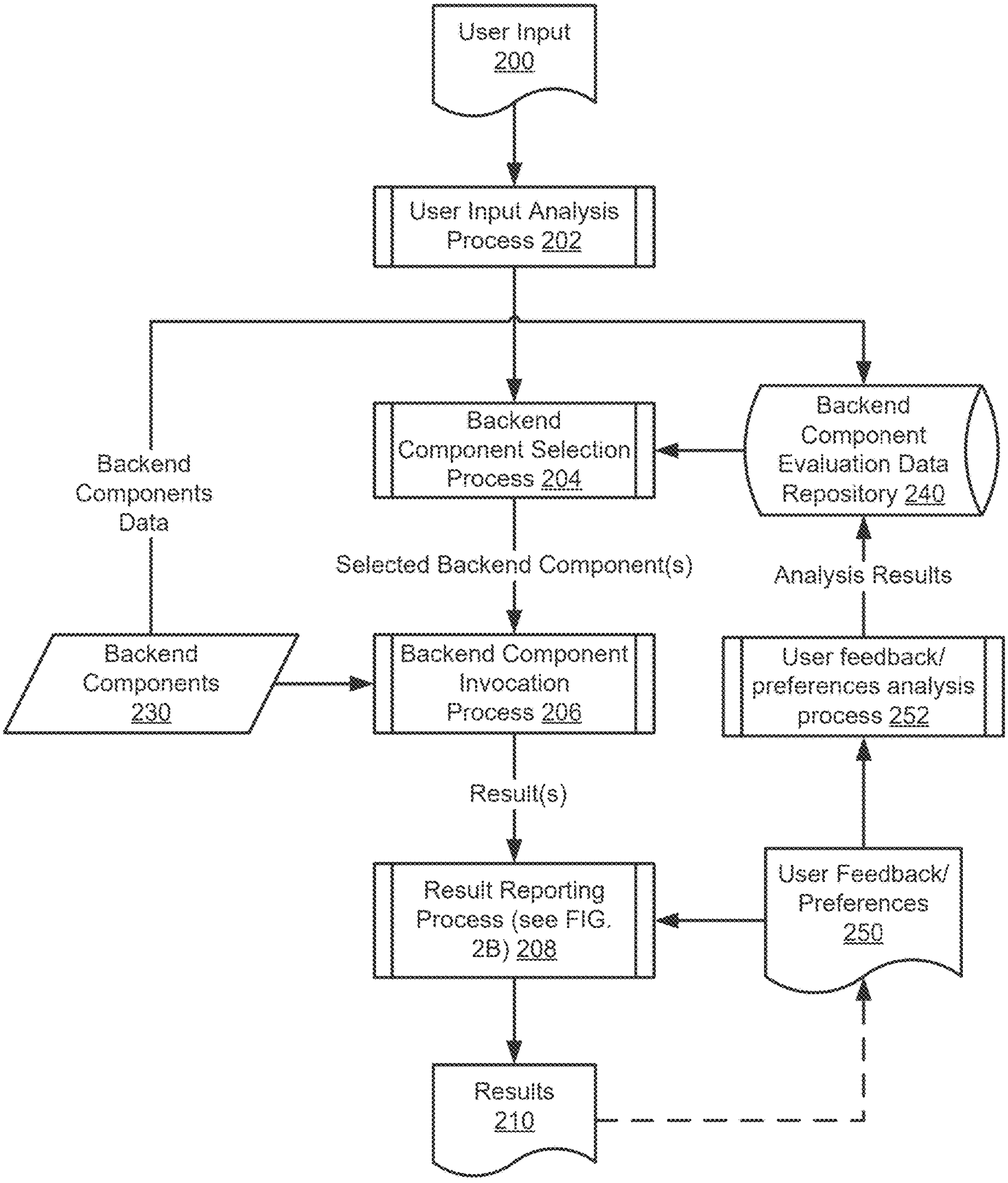
FIGS. 2A-2B shows data flow diagrams in accordance with one or more embodiments.
Figure 2B:
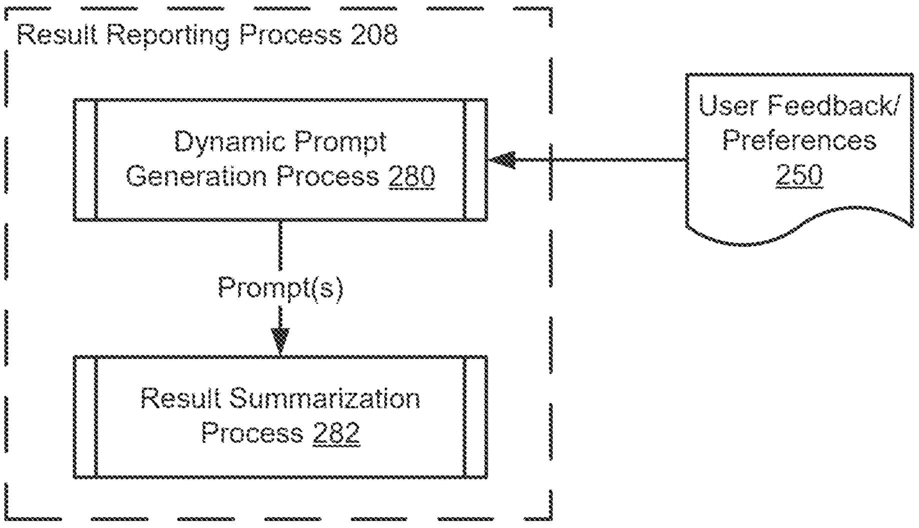

To further clarify embodiments disclosed herein, data flow diagrams in accordance with an embodiment are shown in FIGS. 2A-2B. In these diagrams, flows of data and processing of data are illustrated using different sets of shapes. A first set of shapes (e.g., 200, 210, 250, etc.) is used to represent data structures, a second set of shapes (e.g., 202, 204, 206, etc.) is used to represent processes performed using and/or that generate data, and a third set of shapes (e.g., 240, etc.) is used to represent large scale data structures such as databases. A fourth set of shapes (e.g., 230) is used to represent backend components.

Turning to FIG. 2A, a first data flow diagram in accordance with one or more embodiments is shown. The first data flow diagram may illustrate the backend component management and orchestrations process of one or more embodiments disclosed herein.

As shown in FIG. 2A, a user input 200 may be obtained (e.g., by the backend component orchestrator 110 of FIG. 1 from any one of the data processing systems 100A-100N, or the like). The user input 200 may be obtained in any form (e.g., in the form of complete sentences, one or more fragments, one or more individual words/terms, or the like) and may be input by a user into a graphical user interface (GUI) that interfaces with, for example, the backend component orchestrator 110. The user input 200 may include information indicative of a user's needs (e.g., creation of an application, or the like) associated with the use of one or more backend components maintained by (e.g., internal backend components) or available to (e.g., external backend components accessed via subscriptions or pay-per-use terms, or the like) an entity that manages and/or owns the backend component orchestrator 110.

For example, the user input 200 may be "I want a picture of a cat." This user input 200 may indicate a user's needs (e.g., need of a backend component that can accurately identify and/or generate images, or the like), and may be used by the user to determine which backend component(s) (internal or external) accessible to the entity will best fit the user's needs.

Other information (e.g., information on the user, user log-in details, time of receipt of the user input, or the like) may also be included in the user input 200 without departing from the scope of embodiments disclosed herein.

In embodiments, the user input 200 may be ingested into a user input analysis process 202. The user input analysis process 202 may be implemented to parse the user input 200 (e.g., using NLP, large language model (LLM), or other similar techniques) to obtain: (i) an intent of the user (also referred to herein as a "user intent"); (ii) the specific request of the user (also referred to herein as just "request"); or the like.

Once the user input 200 has been parsed and analyzed (e.g., using user input analysis process 202), the parsed/analyzed information may be used by a backend component selection process 204 to select one or more backend components (e.g., select a set of one or more backend components) that best fit the user intent and request. The same NLP, LLM, or the like techniques used by the user input analysis process 202 may also be utilized by the backend component selection process 204 to select the backend component(s).

For example, continuing with the above example where the user input 200 is "I want a picture of a cat," in one example, NLP techniques may be utilized to recognize predefined user intentions and map (e.g., using one or more mapping tables) these intentions to backend component(s) (internal or external) accessible to the entity. For example, from the statement "I want a picture of a cat," the user input analysis process 202 may use NLP techniques to recognize that the user's intentions as being directed to predefined user intentions (e.g., predefined/prestored keywords) such as "image generation" and "cat". One or more mapping tables may then be used to map these two terms (e.g., image generation and cat) to one or more backend components. In this specific, but non-limiting, example, the term "image generation" may be mapped to a specific backend component such as a generative adversarial network (GAN) while the term "cat" may be used as an input condition to generate a picture of a cat using the GAN.

Any number and any type of these predefined user intentions and mapping tables may be provided to and stored by the backend component orchestrator 110 without departing from the scope of embodiments disclosed herein.

As another example, the user input analysis process 202 may utilize an LLM to analyze the user input 200. For example, the LLM may be provided with functional descriptions of backend component(s) (internal or external) accessible to the entity as prompts for in context learning. Then, based on the user input 200, the LLM may be used to match one or more of the backend components to the user input 200 and recognize or generate the corresponding parameters.

Other techniques (besides NLP and LLM techniques) may also be utilized to parse and analyze the user input 200 and select one or more backend components without departing from the scope of embodiments disclosed herein.

In embodiments, as part of the selection, the backend component selection process 204 may utilize data stored in a backend component evaluation data repository 240. This backend component evaluation data repository 240 may be stored within the backend component orchestrator 110, or external to the backend component orchestrator 110 (e.g., in a remote server and/or computing device that is distinct and separate from the backend component orchestrator 110).

In embodiments, the backend component evaluation data repository 240 may be configured to store, for example: (i) a list of all backend component(s) (internal or external) accessible to the entity; (ii) a model accuracy parameter for each of the backend components on the list; (iii) user preferences, user feedback, and other user-related information associated with one or more users that provide instances of the user input 200; (iv) invocation performance statistics/parameters of each of the backend components on the list; or the like.

In embodiments, the model accuracy parameter may be continuously and dynamically updated and based on feedback received from users that provide instances of the user input 200. For example, assume that the list of backend components includes an LLM model. Each time this LLM model is selected and invoked, users that receive results from such invocation may provide feedback (e.g., user feedback) associated with the model's accuracy (e.g., "this answer looks perfect", "this was not the answer I wanted", "is there anything better?", or the like). Such feedback may be quantified (e.g., using any type of quantification, normalization, scoring, or the like techniques) into an accuracy value that then becomes a basis for continuously and dynamically updating the model accuracy parameter of the LLM. As a result, when subsequent ones of the user input 200 containing similar requests are received, the backend component orchestrator 110 may select this LLM (in the event the LLM has a high model accuracy parameter (e.g., a value exceeding one or more predefined threshold values and/or ranges) for fulfilling these subsequent user inputs.

In embodiments, user preferences, user feedback, and other user-related information associated with one or more users that provide instances of the user input 200 may include any type of information that is provided by, associated with, or the like with a user. For example, assume that the user is a product manager with the highest level of clearance and/or access authority within the entity. Such information about the user's position, rank, clearance and/or access may be included as the user-related information. Further assume that this user prefers the use of LLMs over GANs and also does not want to incur any monetary costs for using any of the backend components. Such information may be included as the user preferences for this user such that user inputs submitted by this user with most likely return results generated by internally hosted/developed LLMs (rather than external LLMs that may cost the entity a monetary value for each use). User feedback may include all or any statements provided by this user (e.g., to backend component orchestrator 110 through the GUI) after results are provided to this user.

Other types of known user preferences, user feedback, and other user-related information not described above may also be included without departing from the scope of embodiments disclosed herein.

In embodiments, invocation performance statistics/parameters may include statistics/parameters such as: (i) monetary costs related to the use of a backend component; (ii) computing resource costs related to the use of a backend component; (iii) latency observed when invoking a backend component; (iv) type of network and/or connection required to invoke the backend component; or the like. Other types of performance statistics/parameters associated with the invocation of a backend component may also be included without departing from the scope of embodiments disclosed herein.

Once the backend component(s) have been selected via the backend component selection process 204, the selected backend component(s) are provided to a backend component invocation process 206 where the selected backend component(s) are invoked to fulfill the user input (namely, invoked to fulfill the user intent and request included in the user input 200).

Any type of backend component invocation processes and/or techniques may be used, as part of backend component invocation process 206, without departing from the scope of embodiments disclosed herein. For example, a unified interface and protocol for invoking the various backend components may be implemented, which ensures consistency and compatibility during the backend component invocation process. In particular, for existing assets (e.g., backend components) of the entity (e.g., internal backend components), additional adapters and/or converters may be implemented to ensure interoperability. For new coming assets (e.g., external backend components), individuals/teams (e.g., developers) of the entity may be recommended to follow a unified interface and protocol design guide.

As part of the invocation, the backend component invocation process 206 may invoke the selected ones of the backend components from the backend components 230 accessible (e.g., available) to the entity. These backend components 230 may include all external and internal backend components that are accessible (e.g., available) to the entity. These backend components 230 may be stored anywhere in the system of FIG. 1 using any combination of the data processing systems 100A-100N and the backend component orchestrator 110 (and unshown computing devices operated by providers (e.g., vendors) of the external backend components). Data of these backend components 230 (e.g., backend components data) may be provided to and stored within the backend component evaluation data repository 240.

Continuing with the continuing with the above example where the user input 200 is "I want a picture of a cat," assume that three (3) backend components are selected. Further assume that the three selected backend components are two internal GANs including GAN A and GAN B and an external AI-based model named "CatFinder1000". GAN A, GAN B, and CatFinder1000 will be invoked by backend component invocation process 206 (e.g., using any type of invocation processes and/or techniques such as application programming interface (API) calls, or the like) to generate, produce, retrieve, or the like a picture of a cat.

In embodiments, such a picture of a cat generated, produced, retrieved, or the like by GAN A, GAN B, and CatFinder1000 may be reported as result(s) of the selected and invoked backend components. Other invocation-related data (such as the above-discussed invocation performance statistics/parameters) associated with the invocation of these backend components may also be included in the result(s) without departing from the scope of embodiments disclosed herein.

In embodiments, the result(s) from invoking the selected backend components may be provided to a result reporting process 208. As shown in FIG. 2B, this result reporting process 208 may include a dynamic prompt generation process 280 and a result summarization process 282.

In particular, dynamic prompt generation process 280 may utilize one or more prompt generation techniques (e.g., LLM-based prompt generation, or the like) to generate one or more prompts for conveying a portion or all of the information making up the result(s) from the backend component invocation process 206. The prompts may be generated using one or more prompt templates that are prestored within (or external to) the backend component orchestrator 110.

The dynamic prompt generation process 280 may also utilize user feedback (e.g., included in user feedback/preferences 250) received from the user that submitted the user input 200 to dynamically modify the generated prompts to fit the user's needs. For example, assume that the user is not technically savvy and is part of a business department of the entity. The user may include (as part of the user feedback/preferences 250) preferences stating that the results should be reported in layman terms that are easier for non-technical users to understand. Dynamic prompt generation process 280 may use such preferences to alter the existing prompts and results to generate layman term responses for the user.

In embodiments, the information included in the user feedback/preferences 250 may be received at any time (e.g., before a user submits a user input 200, after the user submits the user input 200 but before receiving results, after the user receives results, or the like) without departing from the scope of one or more embodiments disclosed herein.

Once all of the prompts have been generated by dynamic prompt generation process 280, the prompts (and the result(s)) are summarized by result summarization process 282. In particular, result summarization process 282 may use any type of techniques (e.g., LLM summarization techniques, generative AI response generation techniques, or the like) to summarize all of the prompts and the results into a coherent response to be presented to the user.

In embodiments, the response may include each of the backend components that were selected during backend component selection process 204. For each of the selected backend components a result (e.g., resolution) obtained by the respective backend components and invocation-related data (e.g., invocation statistics, or he like) associated with the obtaining of the resolution may be included.

Continuing with the above example where the user input 200 is "I want a picture of a cat," the response may include the cat pictures generated by each of GAN A, GAN B, and CatFinder1000. Each cat picture may also be accompanied by invocation statistics like "this picture took 10 seconds to generate, was generated using GAN A, costs the use of this much computing resources out of the total computing resources available to us, and costs us 0 dollars to obtain."

As part of the result summarization process 282, techniques and/or strategies such as weighted fusion, voting fusion, or confidence-based fusion may be used to ensure accuracy and stability of the final result in the presence of data conflicts or inconsistencies. These techniques and/or strategies may also be used to rank the result(s) provided by the backend component invocation process 206. Other techniques and/or strategies not listed above may also be utilized without departing from the scope of embodiments disclosed herein.

Returning now to FIG. 2A, the results (e.g., the summarized response generated by result summarization process 282) may be provided the user (e.g., the user that submitted user input 200) as results 210. For example, results 210 may be displayed on the GUI on which the user input 200 was received.

Upon receiving the results 210, the user may provide user feedback in the form of user feedback/preferences 250. As discussed above, information included in user feedback/preferences 250 may be used to dynamically alter the summarized response (also referred to herein as a "summary") included in the results 210. For example, if a user is unhappy (or just not completely satisfied) with how the results 210 look, the user may use the GUI to provide the user feedback/preferences 250 to cause result reporting process 208 to be repeated until the user receives a satisfactory results 210.

Additionally, user feedback/preferences 250 may be provided to a user feedback/preferences analysis process 252 where the information contained in user feedback/preferences 250 is analyzed to: (i) update the data stored in backend component evaluation data repository 240; (ii) further update the summarized response included in the results 210 (e.g., using result reporting process 208); or the like.

For example, the user feedback/preferences analysis process 252 may implement (e.g., using machine learning techniques, or the like), at least: (i) a backend component accuracy evaluation; (ii) a user preference analysis; (iii) a backend component performance evaluation; or the like.

In particular, backend component accuracy evaluation may be used to evaluate the accuracy of the current answer (e.g., current summarized response in the results 210) based on user feedback. The evaluation may then utilize NLP technique (or the like) to map text to sentiment on accuracy. For example, the comments like "This is inaccurate" or "This is incorrect" will reduce the accuracy score of all the selected backend component(s). The results of this backend component accuracy evaluation may be used to continuously dynamically update the backend component accuracy parameter stored in the backend component evaluation data repository 240.

In embodiments, user preference analysis may use similar techniques (used in the backend component accuracy evaluation) to analyze user preferences and their relevance to the current user's likings. For example, user preference analysis may consider whether a backend component, despite having good accuracy, may not provide answers that align with the user's preferences. This may be based on user feedback such as "Can you rephrase it?" or "I am a [specific role], please explain using [related terminology]." Such user feedback/preferences may also be used to continuously and dynamically update similar data stored in the backend component evaluation data repository 240 (e.g., the user preferences, user feedback, and other user-related information associated with one or more users that provide instances of the user input 200 stored in backend component evaluation data repository 240).

In embodiments, backend component performance evaluation may include objective data such as cost and latency, derived from the inherent attributes of each backend components API (or the like). Backend component performance evaluation may also account for the cost and time required for invoking a particular backend component. Results from the backend component performance evaluation may be stored into backend component evaluation data repository 240 to continuously and dynamically update the invocation performance statistics/parameters stored in the backend component evaluation data repository 240.

After being updated, the updated backend component evaluation data repository 240 may be in subsequent queries (e.g., subsequent submissions of user input 200) to provide better results (e.g., selection of better backend components, or the like) to the users submitting the subsequent ones of the user input 200.

Continuing with the above example where the user input 200 is "I want a picture of a cat," assume that the user provides (e.g., as user feedback/preferences 250) a statement such as "I prefer LLMs over GANs and I do not want to incur any monetary costs for using any of the backend components." The backend component orchestrator 110 may repeat any (or all) of the processes of FIG. 2A discussed above to provide the user with new results 210 that do not include invocation GAN A, GAN B, and CatFinder1000, but rather invocation of a completely different set of backend components such as LLM A and LLM B. Such repetition of the any (or all) of the processes of FIG. 2A may be done automatically after receiving the user's statement of "I prefer LLMs over GANs and I do not want to incur any monetary costs for using any of the backend components," and/or may be executed after the user resubmits an identical user input 200 that resulted the first set of results 210.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
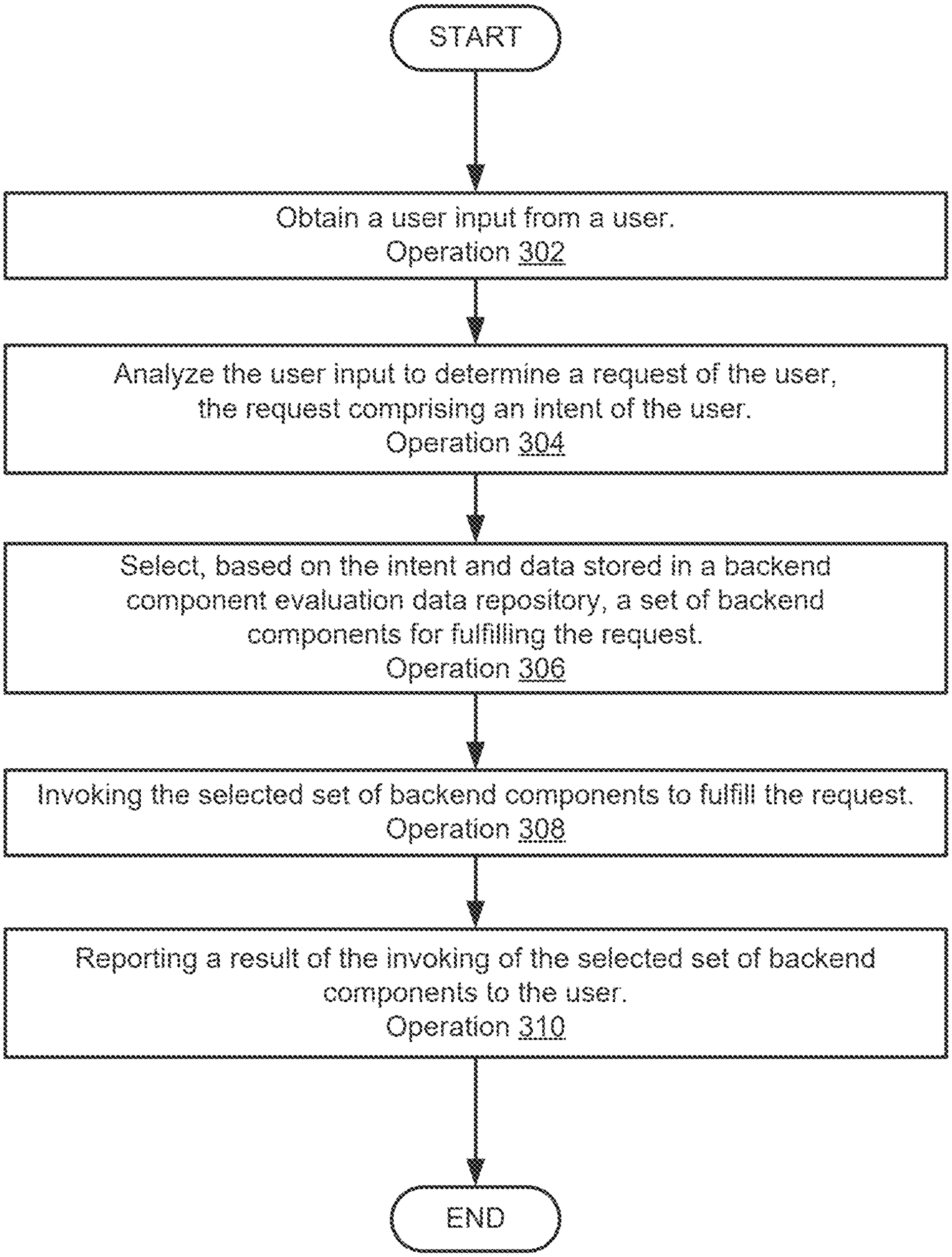
FIGS. 3A-3B show flow diagrams in accordance with one or more embodiments.
Figure 3B:
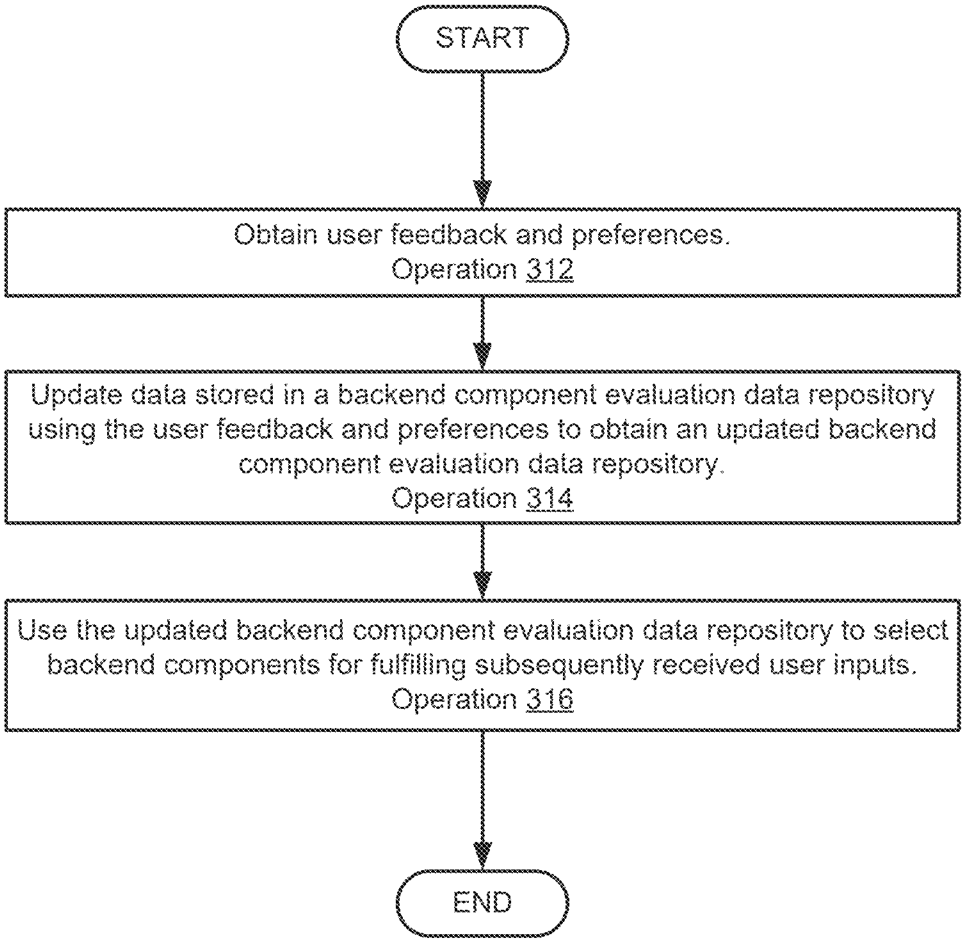

As discussed above, the components of FIG. 1 may perform various methods to manage and orchestrate backend components. FIGS. 3A-3B illustrate flow charts of methods that may be performed by the components of the system of FIG. 1 in accordance with an embodiment. In the diagrams discussed below and shown in FIGS. 3A-3B, any of the operations may be repeated, performed in different orders, and/or performed in parallel with or in a partially overlapping in time manner with other operations.

Turning to FIG. 3A, a first flow diagram illustrating a method of managing and orchestrating backend components in accordance with one or more embodiments is shown. The method may be performed, for example, by any of the components of the system of FIG. 1, and/or other components not shown therein.

At operation 302, as discussed above in reference to FIG. 2A, a user input (e.g., user input 200 of FIG. 2A) may be obtained from a user.

At operation 304, as discussed above in reference to FIG. 2A (namely, as part of the description of user input analysis process 202), the user input may be analyzed to determine (e.g., obtain) a request (and an intent) of the user. The request may include the intent of the user.

At operation 306, as discussed above in reference to FIG. 2A (namely, as part of the description of backend component selection process 204), a set of backend components for fulfilling the request may be selected based on the intent and based on data stored in a backend component evaluation data repository.

In embodiments, a set of backend components may include any number of backend components larger than one (e.g., a single) backend component. More specifically, the set of backend components may include a single backend component, two backend components, or any number larger than two backend components.

At operation 308, as discussed above in reference to FIG. 2A (namely, as part of the description of backend component invocation process 206), the selected set of backend components may be invoked to fulfill the request.

At operation 310, as discussed above in reference to FIGS. 2A-2B (namely, as part of the description of result reporting process 208 including dynamic prompt generation process 280 and result summarization process 282), the result of the invoking of the selected set of backend components may be reported (e.g., provided) to the user (e.g., the user that provided the user input at operation 302).

The process may end following operation 310.

Turning now to FIG. 3B, a second flow diagram illustrating a method of managing and orchestrating backend components in accordance with one or more embodiments is shown. The method may be performed, for example, by any of the components of the system of FIG. 1, and/or other components not shown therein.

In embodiments, the method shown in FIG. 3B may be performed at any time before or after the method shown in FIG. 3A.

At operation 312, as discussed above in reference to FIG. 2A (namely, as part of the description of user feedback/preferences 250 and user feedback/preferences analysis process 252), user feedback and/or user preferences may be obtained (e.g., from any source including from the user).

At operation 314, as discussed above in reference to FIG. 2A (namely, as part of the description of user feedback/preferences 250 and user feedback/preferences analysis process 252), data stored in a backend component evaluation data repository may be updated using the user feedback and/or user preferences to obtain an updated backend component evaluation data repository.

At operation 316, as discussed above in reference to FIG. 2A (namely, as part of the description of user feedback/preferences 250 and user feedback/preferences analysis process 252), the updated backed component evaluation data repository may be used to select (updated, new, the same, different, or the like) backend components (e.g., a set of backend components) for fulfilling subsequently received user inputs.

The method may end following operation 316.

Figure 4:
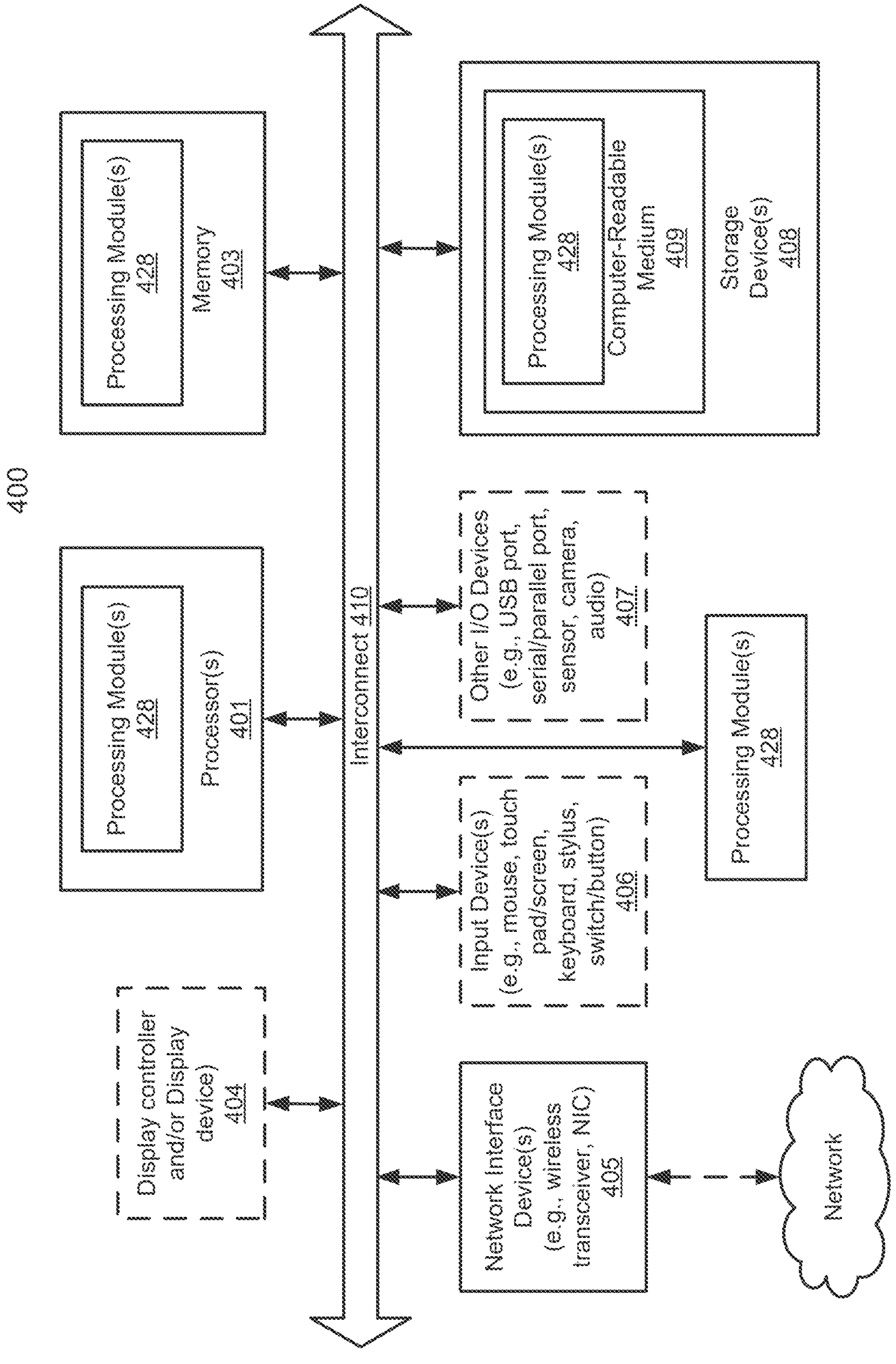
FIG. 4 shows a block diagram illustrating a data processing system in accordance with one or more embodiments.

Any of the components illustrated in FIGS. 1-3B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations.

System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like.

More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets.

Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device.

For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing backend components, the method comprising:

obtaining a first user input comprising a first request from a user;

parsing the first user input to obtain one or more prestored keywords that are related to an intention of the user and a result desired by the user, the one or more prestored keywords being stored in and obtained from a backend component evaluation data repository;

selecting, based on data stored in the backend component evaluation data repository, a first set of the backend components for fulfilling the first request by:

using, one or more mapping tables stored in the backend component evaluation data repository, to map the one or more prestored keywords to ones of the first set of the backend components, the first set of the backend components and the one or more prestored keywords being stored in the one or more mapping tables as mapped data, the first set of the backend components being only non-user-facing components that are not made visible to the user and that execute one or more backend processes to complete the first request, and the first set of the backend components being different from frontend components that receive a first result of the first request from the first set of the backend components and that the user is able to interact with to provide the first user input and receive the first result;

invoking the first set of the backend components to fulfill the first request, wherein the first set of the backend components comprise components that are not originally designed to be interoperable with one another and are invoked to follow a unified interface and protocol defined by an entity of which the user is a member such that all of the first set of the backend components become interoperable with one another, the unified interface and protocol being defined and provided for use by only the backend components when one or more of the backend components are invoked to fulfill one or more user requests and is separate from a summarization process used to compile the first result into a format used by the frontend components to report the first result to the user; and reporting the first result of the first request to the user, wherein the first result comprises, as information making up the first result and displayed together as a whole to the user:

each of the backend components making up the first set of the backend components, a resolution to the first request generated by each of the backend components making up the first set of the backend components, and for each of the backend components making up the first set of the backend components, invocation statistics associated with an obtaining of the resolution, the invocation statistics comprising at least a type of network connection required to invoke each of the backend components making up the first set of the backend components, a component type of each of the backend components making up the first set of the backend components, and a total amount of computing resources used to generate the first result out of a total amount of computing resources available to the user.

2. The method of claim 1, wherein the data stored in the backend component evaluation data repository comprises an accuracy of each of the backend components and invocation performance of each of the backend components.

3. The method of claim 2, wherein the data stored in the backend component evaluation data repository further comprises a user preference of the user.

4. The method of claim 2, wherein the accuracy of each of the backend components is based on feedback received from the user and other users that submitted other ones of the first user input.

5. The method of claim 1, further comprising:

obtaining, after reporting the first result and from the user, user feedback with regard to the first result; and updating the data stored in the backend component evaluation data repository using the user feedback to obtain an updated backend component evaluation data repository.

6. The method of claim 5, further comprising:

obtaining a second user input comprising a second request from the user, the second request being identical to the first request;

invoking, based on data stored in the updated backend component evaluation data repository, a second set of the backend components to fulfill the second request; and reporting a second result of the second request to the user.

7. The method of claim 6, wherein the second set of the backend components is different from the first set of the backend components.

8. The method of claim 1, wherein reporting the first result of the first request to the user comprises:

generating one or more prompts for conveying the information making up the first result;

generating, using a large language model (LLM), a summary comprising a summarization of the one or more prompts and the information making up the first result; and providing the summary to the user as the first result.

9. The method of claim 8, wherein the one or more prompts are dynamically generated based on a prompt preference of the user.

10. The method of claim 1, wherein the user is part of a first internal team of the entity and at least one of the backend components of the first set of the backend components is managed by a second internal team of the entity that is different from the first internal team, the user having no direct access to information associated with the at least one of the backend components of the first set of the backend components that is generated and managed by the second internal team without communicating with the second internal team or without being provided with the first result.

11. The method of claim 1, wherein the first set of the backend components are selected from a group of backend components accessible to the entity of which the user is the member, the group of backend components being made up of internal backend components that are existing assets of the entity.

12. The method of claim 11, wherein the unified interface and protocol comprises:

for the internal backend components, one or more adapters or convertors that are used by the internal backend components to implement interoperability between all of the internal backend components; and for external backend components that are not yet added into the group of backend components, a unified interface and protocol design guide specifying how the external backend components should be designed to be interoperable with all of the internal backend components that make up the group of backend components.

13. A non-transitory machine-readable medium having instructions stored therein, which when executed by a processor, cause the processor to perform operations for managing backend components, the operations comprising:

obtaining a first user input comprising a first request from a user;

parsing the first user input to obtain one or more prestored keywords that are related to an intention of the user and a result desired by the user, the one or more prestored keywords being stored in and obtained from a backend component evaluation data repository;

selecting, based on data stored in the backend component evaluation data repository, a first set of the backend components for fulfilling the first request by:

using, one or more mapping tables stored in the backend component evaluation data repository, to map the one or more prestored keywords to ones of the first set of the backend components, the first set of the backend components and the one or more prestored keywords being stored in the one or more mapping tables as mapped data, the first set of the backend components being only non-user-facing components that are not made visible to the user and that execute one or more backend processes to complete the first request, and the first set of the backend components being different from frontend components that receive a first result of the first request from the first set of the backend components and that the user is able to interact with to provide the first user input and receive the first result;

invoking the first set of the backend components to fulfill the first request, wherein the first set of the backend components comprise components that are not originally designed to be interoperable with one another and are invoked to follow a unified interface and protocol defined by an entity of which the user is a member such that all of the first set of the backend components become interoperable with one another, the unified interface and protocol being defined and provided for use by only the backend components when one or more of the backend components are invoked to fulfill one or more user requests and is separate from a summarization process used to compile the first result into a format used by the frontend components to report the first result to the user; and reporting the first result of the first request to the user, wherein the first result comprises, as information making up the first result and displayed together as a whole to the user:

each of the backend components making up the first set of the backend components, a resolution to the first request generated by each of the backend components making up the first set of the backend components, and for each of the backend components making up the first set of the backend components, invocation statistics associated with an obtaining of the resolution, the invocation statistics comprising at least a type of network connection required to invoke each of the backend components making up the first set of the backend components, a component type of each of the backend components making up the first set of the backend components, and a total amount of computing resources used to generate the first result out of a total amount of computing resources available to the user.

14. The non-transitory machine-readable medium of claim 13, wherein the data stored in the backend component evaluation data repository comprises an accuracy of each of the backend components and invocation performance of each of the backend components.

15. The non-transitory machine-readable medium of claim 14, wherein the data stored in the backend component evaluation data repository further comprises a user preference of the user.

16. The non-transitory machine-readable medium of claim 14, wherein the accuracy of each of the backend components is based on feedback received from the user and other users that submitted other ones of the first user input.

17. A backend component orchestrator, comprising:

a processor; and a memory coupled to the processor to store instructions, which when executed by the processor, cause the processor to perform operations for managing backend components, the operations comprising:

obtaining a first user input comprising a first request from a user;

parsing the first user input to obtain one or more prestored keywords that are related to an intention of the user and a result desired by the user, the one or more prestored keywords being stored in and obtained from a backend component evaluation data repository;

selecting, based on data stored in the backend component evaluation data repository, a first set of the backend components for fulfilling the first request by:

using, one or more mapping tables stored in the backend component evaluation data repository, to map the one or more prestored keywords to ones of the first set of the backend components, the first set of the backend components and the one or more prestored keywords being stored in the one or more mapping tables as mapped data, the first set of the backend components being only non-user-facing components that are not made visible to the user and that execute one or more backend processes to complete the first request, and the first set of the backend components being different from frontend components that receive a first result of the first request from the first set of the backend components and that the user is able to interact with to provide the first user input and receive the first result;

invoking the first set of the backend components to fulfill the first request, wherein the first set of the backend components comprise components that are not originally designed to be interoperable with one another and are invoked to follow a unified interface and protocol defined by an entity of which the user is a member such that all of the first set of the backend components become interoperable with one another, the unified interface and protocol being defined and provided for use by only the backend components when one or more of the backend components are invoked to fulfill one or more user requests and is separate from a summarization process used to compile the first result into a format used by the frontend components to report the first result to the user; and reporting the first result of the first request to the user, wherein the first result comprises, as information making up the first result and displayed together as a whole to the user:

each of the backend components making up the first set of the backend components, a resolution to the first request generated by each of the backend components making up the first set of the backend components, and for each of the backend components making up the first set of the backend components, invocation statistics associated with an obtaining of the resolution, the invocation statistics comprising at least a type of network connection required to invoke each of the backend components making up the first set of the backend components, a component type of each of the backend components making up the first set of the backend components, and a total amount of computing resources used to generate the first result out of a total amount of computing resources available to the user.

18. The backend component orchestrator of claim 17, wherein the data stored in the backend component evaluation data repository comprises an accuracy of each of the backend components and invocation performance of each of the backend components.

19. The backend component orchestrator of claim 18, wherein the data stored in the backend component evaluation data repository further comprises a user preference of the user.

20. The backend component orchestrator of claim 17, wherein the first set of the backend components are selected from a group of backend components accessible to the entity of which the user is the member, the group of backend components being made up of internal backend components that are existing assets of the entity.

* * * * *